US011372575B2

(12) United States Patent
Mizuno et al.

(10) Patent No.: US 11,372,575 B2
(45) Date of Patent: Jun. 28, 2022

(54) INFORMATION PROCESSING DEVICE AND INFORMATION PROCESSING METHOD

(71) Applicant: Hitachi, Ltd., Tokyo (JP)

(72) Inventors: Kazuhiko Mizuno, Tokyo (JP); Yohsuke Ishii, Tokyo (JP); Masayuki Sakata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 20 days.

(21) Appl. No.: 17/174,534

(22) Filed: Feb. 12, 2021

(65) Prior Publication Data

US 2022/0091745 A1 Mar. 24, 2022

(30) Foreign Application Priority Data

Sep. 18, 2020 (JP) .............................. JP2020-157457

(51) Int. Cl.
*G06F 3/06* (2006.01)
*G06F 16/25* (2019.01)
*G06F 16/2457* (2019.01)

(52) U.S. Cl.
CPC ............ *G06F 3/065* (2013.01); *G06F 3/0604* (2013.01); *G06F 3/067* (2013.01); *G06F 3/0647* (2013.01); *G06F 16/24573* (2019.01); *G06F 16/254* (2019.01)

(58) Field of Classification Search
CPC ...... G06F 3/065; G06F 3/0604; G06F 3/0647; G06F 3/067

USPC ......................................................... 711/162
See application file for complete search history.

(56) References Cited

U.S. PATENT DOCUMENTS

| 8,260,913 | B2 | 9/2012 | Knapp et al. | |
|---|---|---|---|---|
| 8,346,731 | B1 | 1/2013 | Tsaur et al. | |
| 10,984,044 | B1* | 4/2021 | Batsakis | G06F 16/907 |
| 11,106,734 | B1* | 8/2021 | Batsakis | G06F 3/0652 |
| 11,250,056 | B1* | 2/2022 | Batsakis | G06F 3/0604 |
| 2019/0011049 | A1* | 1/2019 | Yanagitake | F16L 23/18 |
| 2019/0108248 | A1* | 4/2019 | Rajan | G06F 16/2272 |

* cited by examiner

*Primary Examiner* — Than Nguyen
(74) *Attorney, Agent, or Firm* — Baker Botts L.L.P.

(57) ABSTRACT

Providing copy data candidates appropriate for a user request. Included are an operational portal that registers user request information; a data catalog that manages information about multiple copy data located at sites configuring a hybrid cloud system; a data allocation service that allocates duplicated copy data to the sites; and a guideline management service that selects a copy data candidate appropriate for user request information. The guideline management service acquires information about copy data containing the same data as user request information from the data catalog and verifies whether there is a copy data candidate satisfying the user request information. When there is consequently no copy data candidate satisfying the user request information, the copy data is allocated to the site on condition that the copy data is optimal enough to satisfy a generation schedule and a processing speed of a copy data candidate satisfying the user request information.

14 Claims, 17 Drawing Sheets

FIG.6

| 600 REQUIRE-MENT ID | 601 REQUIRE-MENT NAME | 602 COPY DATA ID | 603 COPY DATA NAME | 604 ALLOCATION LOCATION | 605 PROVISION DESTINATION | 606 PROVISIONING TIME (MINUTES) | 607 COST-EFFECTIVENESS (YEN) | 608 COST RANK | 609 APPLICATION DEPLOYMENT DESTINATION | 610 PROCESSING EFFECT (MINUTES) | 611 PROCESSING RANK |
|---|---|---|---|---|---|---|---|---|---|---|---|
| 1 | COST | 1 | CPdata1 | ON-PREMISE | EDGE | 5 | 0 | 1 | PUBLIC CLOUD | 20 | 3 |
| | | | | | ON-PREMISE | 1 | 0 | 1 | PUBLIC CLOUD | 10 | 2 |
| | | | | | PUBLIC CLOUD | 10 | 1000 | 2 | PUBLIC CLOUD | 1 | 1 |
| | | 2 | CPdata2 | PUBLIC CLOUD | EDGE | 10 | 2000 | 3 | PUBLIC CLOUD | 20 | 3 |
| | | | | | ON-PREMISE | 10 | 2000 | 3 | PUBLIC CLOUD | 10 | 2 |
| | | | | | PUBLIC CLOUD | 1 | 1000 | 2 | PUBLIC CLOUD | 1 | 1 |
| | | 3 | CPdata3 | PUBLIC CLOUD | EDGE | 10 | 2000 | 3 | PUBLIC CLOUD | 20 | 3 |
| | | | | | ON-PREMISE | 10 | 2000 | 3 | PUBLIC CLOUD | 10 | 2 |
| | | | | | PUBLIC CLOUD | 1 | 1000 | 2 | PUBLIC CLOUD | 1 | 1 |
| ... | | ... | ... | ... | ... | ... | ... | ... | ... | ... | ... |

| 700 JOB ID | 701 JOB NAME | 702 TARGET APPLICATION | 703 APPLICATION OPERATION DESTINATION | 704 TARGET DATA | 705 DATA TYPE | 706 DATA ALLOCATION DESTINATION | 707 DATA FLOW | 708 MIGRATED DATA ALLOCATION DESTINATION | 709 MIGRATED DATA | 710 MIGRATED DATA TYPE | 711 IMPLEMENTATION DATE AND TIME | 712 PERSON IN CHARGE | 713 JOB TIME |
|---|---|---|---|---|---|---|---|---|---|---|---|---|---|
| 1 | ANALYSIS DATA PREPARATION | ANALYSIS TOOL | PUBLIC CLOUD | Data1 | REAL DATA | EDGE | DATA MART GENERATION | ON-PREMISE | Mart1 | PROCESS DATA | 2020.01.01 12:00:00 | INFRA-STRUCTURE MANAGER A | 5 HOURS |
|   |   |   | PUBLIC CLOUD | Mart1 | PROCESS DATA | ON-PREMISE | COPY DATA GENERATION | PUBLIC CLOUD | Copy1 | COPY DATA | 2020.01.02 10:00:00 | INFRA-STRUCTURE MANAGER A | 5 HOURS |
| 2 | BACKUP | - | ON-PREMISE | Lake1 | DATA LAKE | ON-PREMISE | BACKUP GENERATION | ON-PREMISE | Backup1 | BACKUP | ALTERNATE SUNDAYS 00:00:00 | INFRA-STRUCTURE MANAGER A | 12 HOURS |
| ... | ... | ... | ... | ... | ... | ... | ... | ... | ... | ... | ... | ... | ... |

| 800 SITE ID | 801 SITE NAME | 802 ACCESS RIGHT | 803 R/W | 804 SERVER INFORMATION ||||||| 811 STORAGE INFORMATION |||||
|---|---|---|---|---|---|---|---|---|---|---|---|---|---|---|
| | | | | 805 SERVER NAME | 806 CPU CORES | 807 CPU UTILIZATION RATE | 808 MEMORY SIZE | 809 MEMORY UTILIZATION RATE | 810 VOLUME SIZE | 812 DEVICE NAME | 813 VOLUME NAME | 814 VOLUME CAPACITY | 815 UTILIZATION RATE | 816 BUSY RATE |
| 1 | EDGE | GroupA | R/W | Srv11 | 4 | 40% | 8GB | 50% | 50GB | Stg11 | Vol11 | 500GB | 30% | 10% |
| 1 | EDGE | GroupA | R/W | Srv12 | 8 | 20% | 16GB | 30% | 100GB | Stg12 | Vol12 | 700GB | 50% | 50% |
| | | ・・ | ・・ | ・・ | ・・ | ・・ | ・・ | ・・ | ・・ | ・・ | ・・ | ・・ | ・・ | ・・ |
| 2 | ON-PREMISE | GroupB | R | Srv21 | 8 | 50% | 32GB | 40% | 500GB | Stg21 | Vol21 | 800GB | 40% | 50% |
| | | ・・ | ・・ | ・・ | ・・ | ・・ | ・・ | ・・ | ・・ | ・・ | ・・ | ・・ | ・・ | ・・ |
| 3 | PUBLIC CLOUD | GroupC | W | Srv31 | 2 | 80% | 4GB | 70% | 50GB | Stg31 | Vol31 | 100GB | 70% | 30% |
| ・・ | | ・・ | ・・ | ・・ | ・・ | ・・ | ・・ | ・・ | ・・ | ・・ | ・・ | ・・ | ・・ | ・・ |

| 900 DATA ID | 901 DATA NAME | 902 TYPE | 903 DATA ALLOCATION LOCATION | 904 PATHNAME | 905 HUSH ID | 906 CREATED DATE AND TIME | 907 SIZE (GB) | 908 ACCESS RIGHT |
|---|---|---|---|---|---|---|---|---|
| 1 | AAA | REAL DATA | EDGE | /tmp/*** | 0x0001 | 2010.01.01 10:00:00 | 500 | GROUP A |
| 2 | BBB | BACKUP DATA | ON-PREMISE | /dev/**** | 0x0001 | 2010.01.01 10:00:00 | 500 | GROUP A |
| 3 | CCC | SNAPSHOT | PUBLIC CLOUD | /etc/*** | 0x0001 | 2010.01.01 10:00:00 | 100 | GROUP A |
| 4 | DDD | COPY DATA | ON-PREMISE | /work/*** | 0x0001 | 2010.01.01 10:00:00 | 50 | GROUP A |
| ⋮ | ⋮ | ⋮ | ⋮ | ⋮ | ⋮ | ⋮ | ⋮ | ⋮ |

| 1000 ACQUISITION DATE AND TIME | 1001 COPY DATA ID | 1002 COPY DATA NAME | 1003 ALLOCATION LOCATION | 1004 PROVISION DESTINATION | 1005 PROVISIONING TIME (MINUTES) | 1006 COST-EFFECTIVENESS (YEN) | 1007 APPLICATION DEPLOYMENT DESTINATION | 1008 PROCESSING EFFECT (MINUTES) | 1009 DATA USAGE FREQUENCY |
|---|---|---|---|---|---|---|---|---|---|
| 2020.01.01 12:00:00 | 1 | CPdata1 | ON-PREMISE | ON-PREMISE | 1 | 0 | PUBLIC CLOUD | 10 | 5 |
| | 2 | CPdata2 | PUBLIC CLOUD | PUBLIC CLOUD | 1 | 1000 | PUBLIC CLOUD | 1 | 1 |
| | 3 | CPdata3 | PUBLIC CLOUD | ON-PREMISE | 10 | 2000 | PUBLIC CLOUD | 10 | 3 |
| ... | ... | ... | ... | ... | ... | ... | ... | ... | ... |

OPERATIONAL PORTAL 501                                                                                    1300

DATA LIST

| SELECT | REQUEST DATA | DETAILED INFO | | REQUIREMENT LIST | |
|---|---|---|---|---|---|
| | | | SELECT | INTENDED REQUIREMENT | TARGET CRITERION |
| ■ | TRANSACTION DATA IN 2020 | DISPLAY | ■ | COST (YEN) | 10,000 |
| □ | TRANSACTION DATA IN 2010 | DISPLAY | □ | PROCESSING PERFORMANCE (MINUTES) | |
| □ | OPERATION DATA OF SERVICE A | DISPLAY | ■ | PROVISION TIME | 2020.03.31 12:00:00 |
| □ | OPERATION DATA OF SERVICE B | DISPLAY | □ | NONE | |

LIST OF PROVISION DATA CANDIDATES

| SELECT | PROVISION DATA CANDIDATE | PROVISION DESTINATION | COST (YEN) | PROCESSING PERFORMANCE (MINUTES) | PROVISION TIME |
|---|---|---|---|---|---|
| ■ | Copydata2 | PUBLIC CLOUD | 1000 | 5 | 2020.01.31 12:00:00 |
| □ | Copydata3 | ON-PREMISE | 0 | 10 | 2020.03.31 10:10:10 |
| □ | ... | | | | |

( DATA INFORMATION ACQUISITION )   ( REQUEST TRANSFER )   ( PROVISION START )

FIG.14

DETAILED DATA SCREEN 1400

TRANSACTION DATA IN 2020

| ATTRIBUTE NAME | PRODUCT ID | PRODUCT NAME | UNIT PRICE | SHIPMENT QUANTITY | REGISTRATION DATE |
|---|---|---|---|---|---|
| DATA TYPE | Integer | String | Integer | Integer | Date |
| DESCRIPTION | ** | ** | ** | ** | ** |
| VALUE | ** | ** | ** | ** | ** |
| SELECT | ▨ | ☐ | ▨ | ☐ | |

SELECTION PERIOD [ ] — [ ]

(REGISTER)  (DELETE)

FIG.15

| 600 REQUIRE- MENT ID | 601 REQUIRE- MENT NAME | 602 COPY DATA ID | 603 COPY DATA NAME | 604 ALLOCATION LOCATION | 605 PROVISION DESTINATION | 606 PROVISIONING TIME (MINUTES) | 607 COST- EFFECTIVENESS (YEN) | 608 COST RANK | 609 APPLICATION DEPLOYMENT DESTINATION | 610 PROCESSING EFFECT (MINUTES) | 611 PROCESSING RANK | 1501 PRIORITIZATION |
|---|---|---|---|---|---|---|---|---|---|---|---|---|
| 1 | COST | 1 | CPdata1 | ON-PREMISE | EDGE | 5 | 0 | 1 | PUBLIC CLOUD | 20 | 3 | C |
| | | | | | ON-PREMISE | 1 | 0 | 1 | PUBLIC CLOUD | 10 | 2 | B |
| | | | | | PUBLIC CLOUD | 10 | 1000 | 2 | PUBLIC CLOUD | 1 | 1 | A |
| | | 2 | CPdata2 | PUBLIC CLOUD | EDGE | 10 | 2000 | 3 | PUBLIC CLOUD | 20 | 3 | C |
| | | | | | ON-PREMISE | 10 | 2000 | 3 | PUBLIC CLOUD | 10 | 2 | A |
| | | | | | PUBLIC CLOUD | 1 | 1000 | 2 | PUBLIC CLOUD | 1 | 1 | A |
| | | 3 | CPdata3 | PUBLIC CLOUD | EDGE | 10 | 2000 | 3 | PUBLIC CLOUD | 20 | 3 | A |
| | | | | | ON-PREMISE | 10 | 2000 | 3 | PUBLIC CLOUD | 10 | 2 | B |
| | | | | | PUBLIC CLOUD | 1 | 1000 | 2 | PUBLIC CLOUD | 1 | 1 | C |
| ... | ... | ... | ... | ... | ... | ... | ... | ... | ... | ... | ... | ... |

| 600 REQUIRE-MENT ID | 601 REQUIRE-MENT NAME | 602 COPY DATA ID | 603 COPY DATA NAME | 604 ALLOCATION LOCATION | 605 PROVISION DESTINATION | 606 PROVISIONING TIME (MINUTES) | 607 COST-EFFECTIVENESS (YEN) | 608 COST RANK | 609 APPLICATION DEPLOYMENT DESTINATION | 610 PROCESSING EFFECT (MINUTES) | 611 PROCESSING RANK | 1600 PROVISION COUNT | 1601 PROVISION COUNT RANK |
|---|---|---|---|---|---|---|---|---|---|---|---|---|---|
| 1 | COST | 1 | CPdata1 | ON-PREMISE | EDGE | 5 | 0 | 1 | PUBLIC CLOUD | 20 | 3 | 0 | 4 |
| | | | | | ON-PREMISE | 1 | 0 | 1 | PUBLIC CLOUD | 10 | 2 | 10 | 2 |
| | | | | | PUBLIC CLOUD | 10 | 1000 | 2 | PUBLIC CLOUD | 1 | 1 | 10 | 2 |
| | | 2 | CPdata2 | PUBLIC CLOUD | EDGE | 10 | 2000 | 3 | PUBLIC CLOUD | 20 | 3 | 1 | 4 |
| | | | | | ON-PREMISE | 10 | 2000 | 3 | PUBLIC CLOUD | 10 | 2 | 10 | 2 |
| | | | | | PUBLIC CLOUD | 1 | 1000 | 2 | PUBLIC CLOUD | 1 | 1 | 20 | 1 |
| | | 3 | CPdata3 | PUBLIC CLOUD | EDGE | 10 | 2000 | 3 | PUBLIC CLOUD | 20 | 3 | 1 | 4 |
| | | | | | ON-PREMISE | 10 | 2000 | 3 | PUBLIC CLOUD | 10 | 2 | 5 | 3 |
| | | | | | PUBLIC CLOUD | 1 | 1000 | 2 | PUBLIC CLOUD | 1 | 1 | 20 | 1 |
| ... | ... | ... | ... | ... | ... | ... | ... | ... | ... | ... | ... | ... | ... |

16513

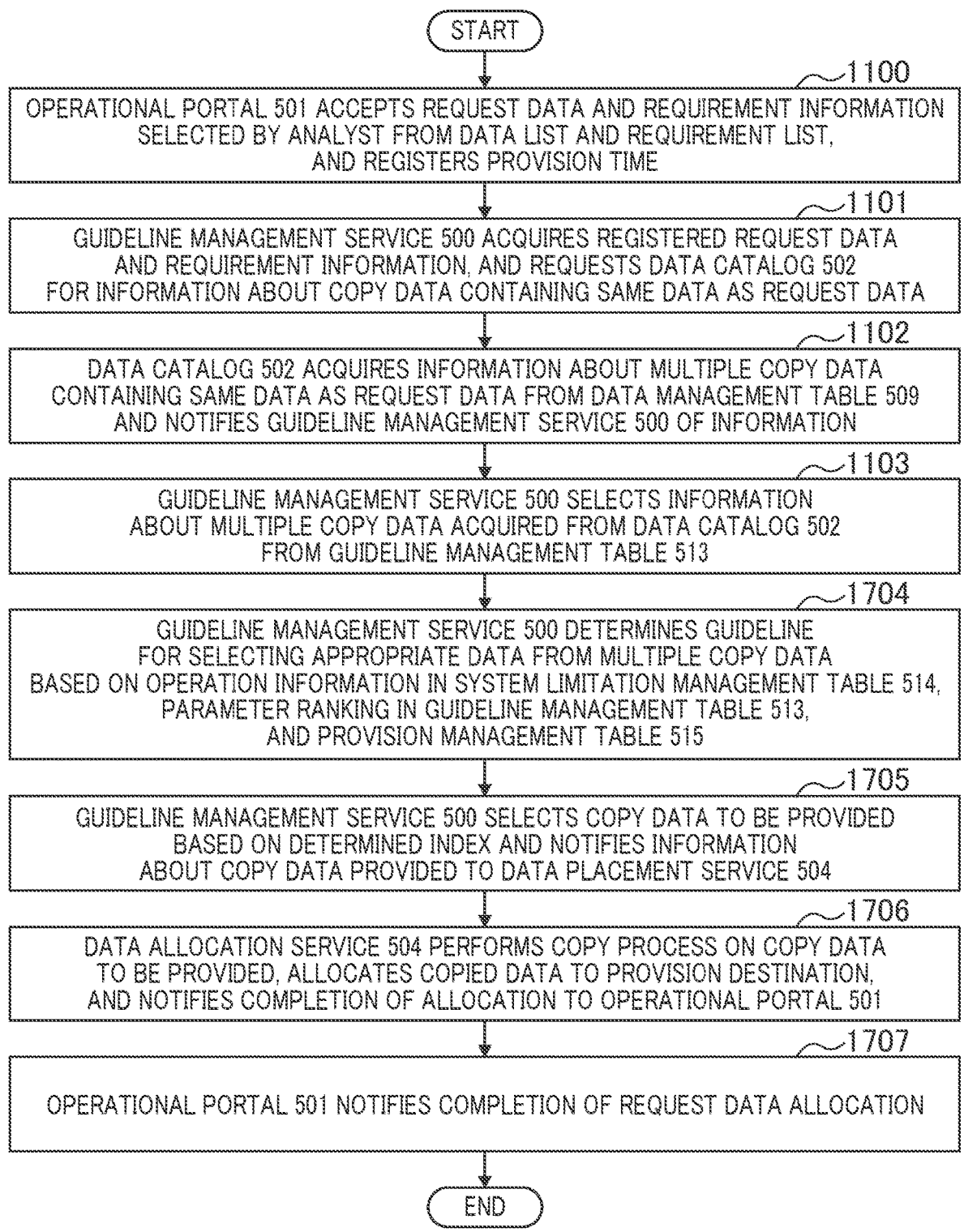

INFORMATION PROCESSING DEVICE AND INFORMATION PROCESSING METHOD

BACKGROUND

The present invention relates to an information processing device and an information processing method and more particularly to the provision of copy data in a hybrid cloud system.

There is the increasing use of a hybrid cloud system that appropriately uses an edge system, an on-premise system, and a public cloud system according to usage requirements from the viewpoint of costs such as usage fees, application processing performance, security related to GDPR (General Data Protection Regulation) compliance and access management, for example. The hybrid cloud system allows the edge system to collect IoT data including operational job data, product operation information, and sensor information, for example. The collected IoT (Internet Of Things) data is stored in a data lake of the on-premise system, for example, and is processed and integrated into a data mart suited to uses such as analysis and operations through the use of data flow processing or ETL (Extract/Transform/Load) processing. The data mart can be used when placed in the public cloud system through the use of data migration or data copying.

An infrastructure manager manages operations of the hybrid cloud system. The operational management includes building and managing production and test environments, managing production backups, and preparing copy data for analysis used by users such as end users and analysts and is applied to the edge system, the on-premise system, and the public cloud system configuring the hybrid cloud system.

An analyst requests the infrastructure manager to provide analytic data (such as analytic data to improve operations from market trend data) to perform analytical operations in the hybrid cloud system. The analytic data requested by the analyst coexists with multiple copy data containing the same data at each site of the hybrid cloud system. For example, original data for the analytic data is acquired as IoT data of the edge system. Copy data is acquired to be used as the analytic data. Backup data is acquired for temporary storage or troubleshooting. The infrastructure manager selects one piece of analytic data requested by the analyst from the multiple copy data and provides the selected analytic data to the analyst.

For example, as disclosed in U.S. Pat. No. 8,346,731, the technique to searching for multiple copy data containing data requested by an analyst calculates a hash value for the target data and assigns the same Universal Indexer ID to the data assigned the same hash value. The name corresponding to the Universal Indexer ID can be presented as one item of a record in the data catalog, enabling a user to select it. Moreover, there is disclosed a technology capable of detecting copy data independently of the replication function of the file system.

The technology disclosed in U.S. Pat. No. 8,260,913 makes it possible to manage location information on a replica (copy) of the target file and respond to a file access request with multiple pieces of the location information on the target file. An application that receives this response can select any location information and acquire the requested file.

SUMMARY

In the hybrid cloud system, each site of the edge system, the on-premise system, and the public cloud system stores multiple copy data such as real data, copy data, and backup data containing the same contents. From the copy data, the system administrator selects and provides copy data suitable for the analyst. The techniques disclosed in U.S. Pat. Nos. 8,346,731 and 8,260,913 make it possible to select multiple copy data containing the same data as the data requested by the analyst. However, the provided copy data may affect the analysis job of the analyst due to a distance between the operation destination of an analysis tool and the location of the provision data, costs at a location of the provision data, or the access right of the analyst.

The analyst cannot understand the configuration or mechanism of the hybrid cloud system and cannot make a specific request when requesting the infrastructure manager to provide analytic data. The infrastructure manager has no way of knowing specific requests from the analyst, cannot clarify guidelines for selecting multiple copy data corresponding to given data, and cannot determine which copy data to select.

It is an object of the present invention to provide copy data candidates suited to user requests.

A preferred embodiment of an information processing device according to the present invention performs processes to provide copy data and includes an operational portal that registers user request information; a data catalog that manages information about multiple copy data located at multiple sites configuring a hybrid cloud system; a data allocation service that allocates duplicated copy data to the site; and a guideline management service that selects a copy data candidate appropriate for user request information. The guideline management service acquires information about copy data containing the same data as user request information from the data catalog and verifies whether there is a copy data candidate satisfying user request information. When there is a copy data candidate satisfying the user request information, the copy data is allocated to the site. When there is no copy data candidate satisfying the user request information, the copy data is allocated to the site on condition that the copy data is optimal enough to satisfy a generation schedule and a processing speed of a copy data candidate satisfying the user request information. The information processing device is configured as above. The present invention is also understood as an information processing method and a program to perform the above-described processes.

The present invention can provide copy data candidates suited to user requests.

BRIEF DESCRIPTION OF THE DRAWINGS

FIG. 6 illustrates a configuration of a guideline management table 513;

FIG. 7 illustrates a configuration of a provision management table 515;

FIG. 8 illustrates a configuration of a system limitation management table 514;

FIG. 9 illustrates a configuration of a data management table 509;

FIG. 10 illustrates a configuration of an operation result management table 516;

FIG. 13 illustrates an analyst operation screen;

FIG. 14 illustrates a detailed data screen;

FIG. 15 illustrates a configuration of the guideline management table according to a second embodiment;

FIG. 16 illustrates another configuration of the guideline management table according to the second embodiment; and FIG. 17 is a flowchart illustrating a process to automatically allocate copy data corresponding to requests from an analyst according to a third embodiment.

DETAILED DESCRIPTION

The description below explains the preferred embodiments of the present invention with reference to the accompanying drawings. The embodiments relate to a technology of providing guidelines for selecting multiple copy data on a hybrid cloud. For example, there is disclosed a technology in which an infrastructure manager incapable of understanding the requirements of a user such as an analyst selects and provides, to the user such as an analyst who does not understand the infrastructure environment, guidelines to select multiple copy data suitable for the analyst.

First Embodiment

The present embodiment applies the technology of providing guidelines for selecting multiple copy data to a hybrid cloud system.

Figure 1:
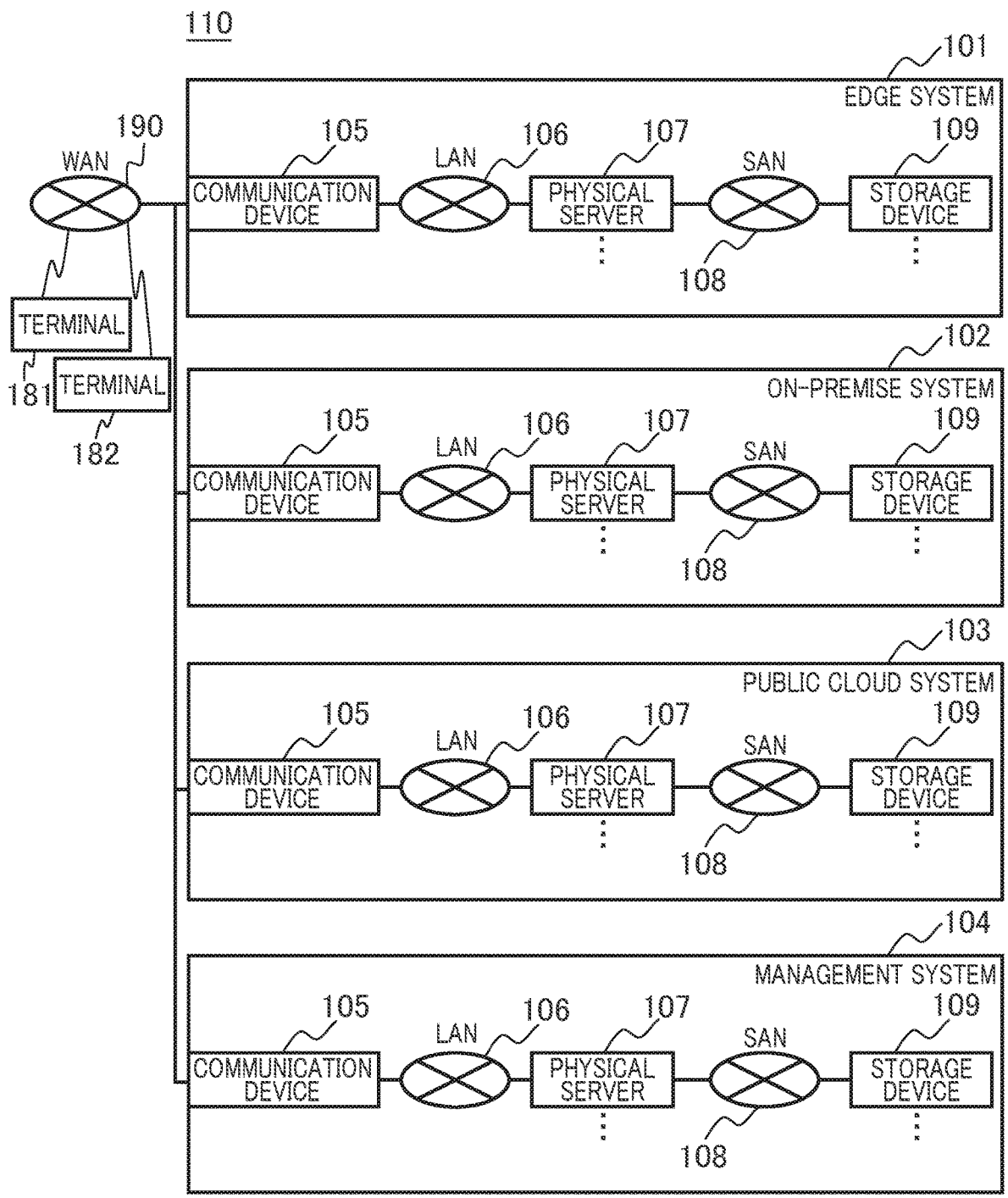
FIG. 1 illustrates a configuration of the hybrid cloud system according to a first embodiment.

FIG. 1 illustrates a configuration of a hybrid cloud system 110. The hybrid cloud system 110 provides a data processing system including an edge system 101, an on-premise system 102, a public cloud system 103, and a management system 104 that are connected via WAN (Wide Area Network) 190. Each of the systems 101 to 104 configuring the hybrid cloud system 110 is called a site. The WAN190 connects with a terminal 181 used by an analyst and a terminal 182 used by an infrastructure manager, making it possible to access a target site.

The edge system 101, the on-premise system 102, the public cloud system 103, and the management system 104 are information processing devices each including a communication device 105 to connect and communicate with the WAN190, a physical server 107 to operate applications such as analysis tools, and a storage device 109 to store actual data and copy data. The communication device 105 and the physical server 107 are connected via a LAN (Local Area Network) 106. The physical server 107 and storage device 109 are connected via a SAN (Storage Area Network) 108. See FIGS. 2 through 5 for details.

The sites 101 through 104 of the hybrid cloud system 110 are assumed to use the same hardware configuration but differ in locations of the sites and providers of the infrastructure environment. For example, the edge system 101 aims at collecting operational job data, product operation information, or sensor information and is therefore located near the place where the data is acquired. The edge system 101 is located remotely from the analyst who performs analysis by using data of the edge system 101.

The on-premise system. 102 prepares products of each vendor for the physical server 107 and storage device 109. The infrastructure manager performs operational management. When the analyst asks the infrastructure manager to build the environment and provide data, the infrastructure manager takes action including the deployment of the infrastructure environment.

The public cloud system 103 uses the cloud environment provided by each cloud vendor. Therefore, the infrastructure manager performs operational management of the public cloud system 103 by using managed services provided by cloud vendors without directly operating the physical server 107 or the storage device 109.

The management system 104 performs the operational management of the hybrid cloud system 110 such as managing data of each site and manages and ensuring the technology of providing guidelines for selecting multiple copy data, for example.

The analyst asks the infrastructure manager to provide analytic data for business improvement from market trend data to perform analysis on the hybrid cloud system 110. The infrastructure manager selects and provides data suitable for the analyst from the data (such as IoT data, copy data, and backup data) managed in one or more sites. Note that the following description may simply refer to the analyst or the infrastructure manager for simplicity's sake instead of referring to the analyst's terminal 181 or the infrastructure manager's terminal 182.

Figure 2:
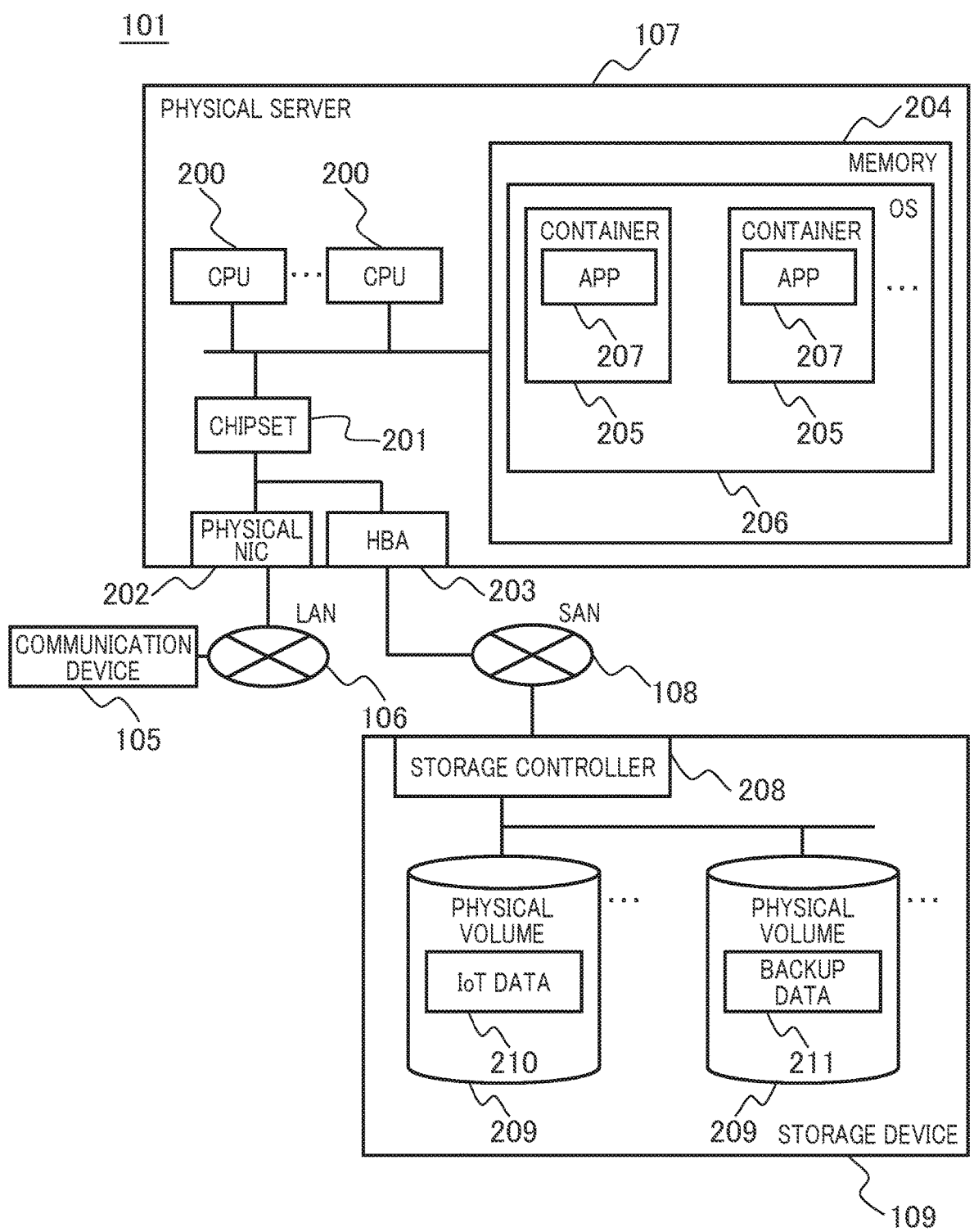
FIG. 2 illustrates a configuration of an edge system 101.

FIG. 2 illustrates a configuration of the edge system 101.

The physical server 107 includes one or more CPUs (Central Processing Units) 200, memory 204, a physical NIC (Network Interface Card) 202, and an HBA (Host Bus Adapter) 203 that are connected to a chipset 215 to manage data transfer.

The CPU 200 exemplifies a control device and executes a program to perform various processes. The memory 204 exemplifies a storage device such as RAM (Random Access Memory), and stores various programs, tables, and the like for example. The physical NIC 202 exemplifies hardware used by the physical server 107 to communicate with the outside. The HBA 203 exemplifies hardware that connects the physical server 107 and the storage device 109 via the SAN 108.

A container 205 is deployed on an open-source platform such as Kubernetes and is comparable to a virtual server resulting from logically separating resources of an OS (Operating System) 206. The container 205 allows the OS 206 and APP 207 as an application to be installed at a time by acquiring an image file from Docker Hub as a repository published on the Internet. The edge system 101 collects operational job data, for example, and the APP 207 to be installed is comparable to an application that collects data.

The storage device 109 includes a storage controller 208 to control the storage device 109 and multiple physical volumes 209. The physical volumes 209 include the physical volume 209 to store operational job data collected by the edge system 101, product operation information, or sensor information as IoT data 210; and the physical volume 209 to store backup data 211 for the IoT data 210.

Figure 3:
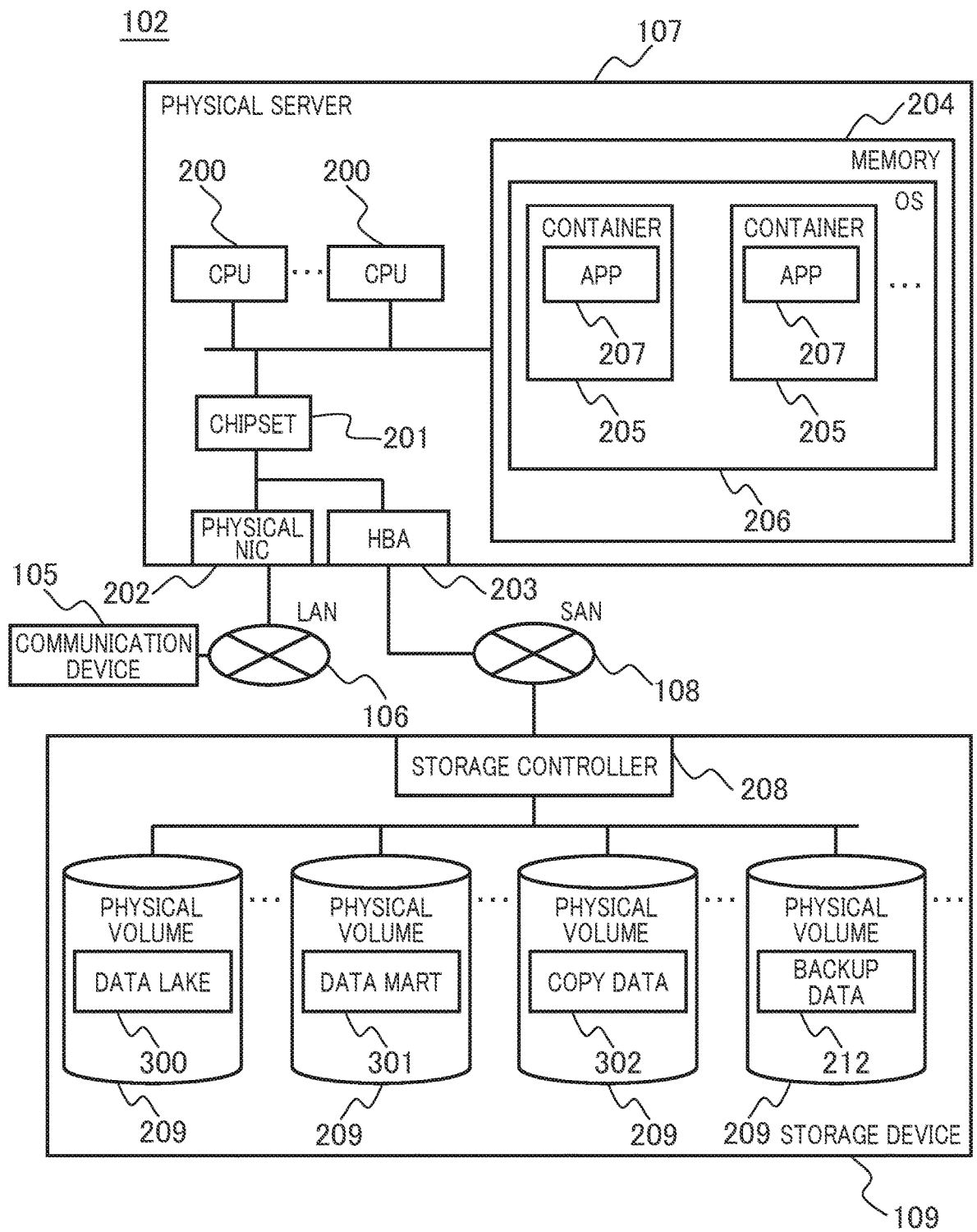
FIG. 3 illustrates a configuration of an on-premise system 102.

FIG. 3 illustrates a configuration of the on-premise system 102.

The on-premise system 102 uses the same hardware configuration as the edge system 101. The on-premise system 102 collects the IoT data 210 stored in the edge system 101 and processes or integrates data to be used for analysis. Therefore, the APP 207 is installed with a migration tool to migrate the IoT data 210 among sites, an ETL tool to process or integrate migrated data, a copy data tool to generate a copy of production data to analyze or test final operations, a backup tool to generate recovery data, an analysis tool used by analysts, and an application used by end users, for example.

The migration tool aggregates the IoT data 210 stored in the edge system 101 into a data lake 300 of the on-premise system 102. The ETL tool processes or integrates data stored in the data lake 300 according to various uses such as analysis. The data generated from the data processing or integration is stored as a data mart 301. The data mart 301 can be used as is for analysis or testing, for example. Moreover, the data mart 301 is copied to generate copy data 302 that is then used for analysis, for example. The backup tool for troubleshooting periodically acquires backup data 212 for the data lake 300 or the data mart 301.

The above-mentioned data lake 300, data mart 301, copy data 302, and backup data 212 are stored in the physical volume 209 of the storage device 109.

Figure 4:
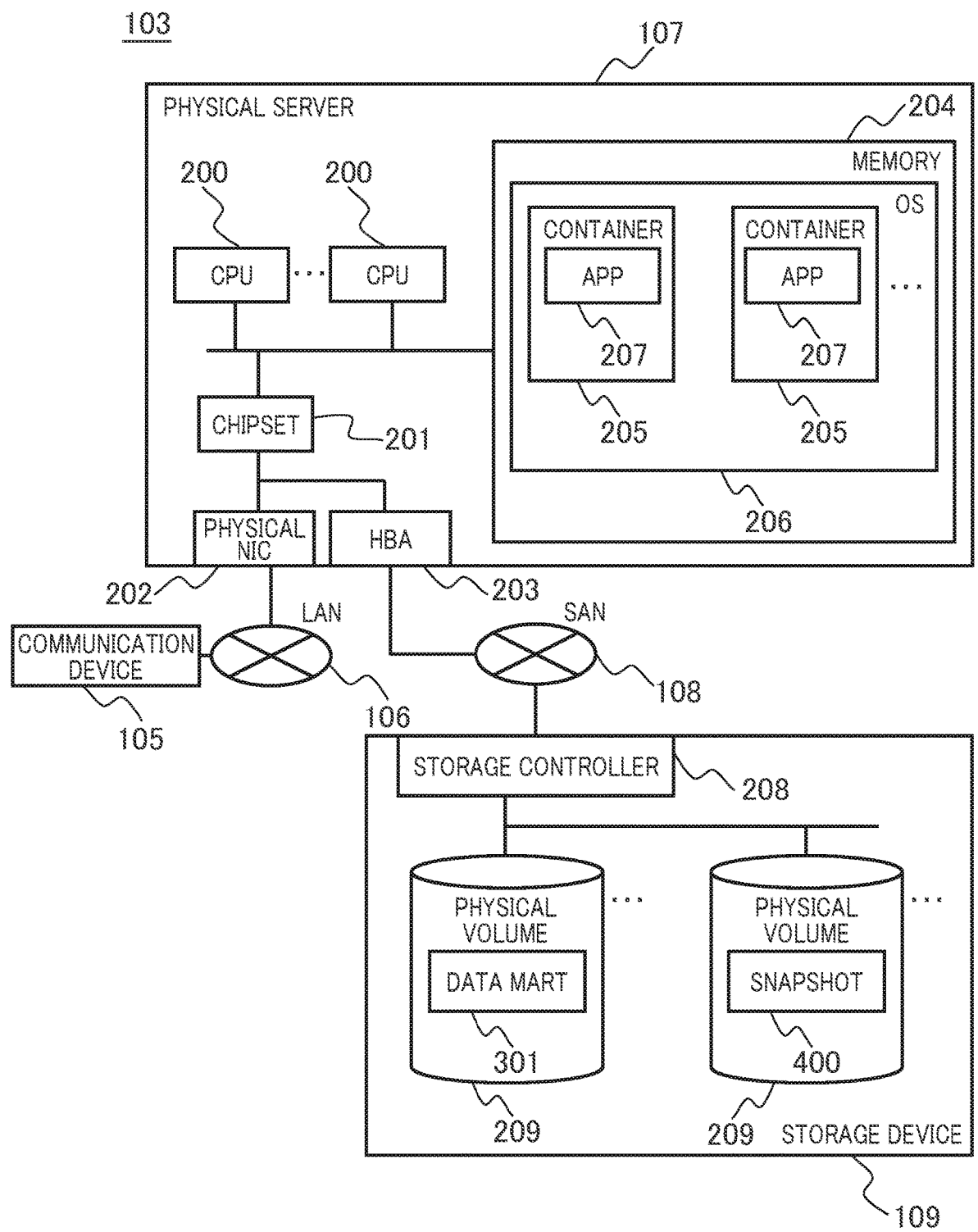
FIG. 4 illustrates a configuration of a public cloud system 103.

FIG. 4 illustrates a configuration of the public cloud system 103.

The public cloud system 103 uses the same hardware configuration as the on-premise system 102 or the edge system 101. However, a cloud provider provides and manages the infrastructure of the public cloud system 103. The infrastructure manager manages the infrastructure of the public cloud system 103 by using managed services provided by the cloud provider.

The public cloud system 103 migrates the data mart 301 generated by the on-premise system 102. Alternatively, the public cloud system 103 stores copied data and progress in the analysis process of the analyst or the job of the end user, as a snapshot 400, on a physical volume of the storage device 109.

The infrastructure manager selects and provides data suitable for the analyst out of the IoT data 210 of the edge system 101, the data lake 300 of the on-premise system 102, the data mart 301, the copy data 302, the snapshot 400 of the public cloud system 103, and the backup data 212 generated at each site.

The storage destination of each data is not fixed to each site and may be changed to any site according to usage situations. Applications used by the analyst for analysis purposes do not run on a specific site. The infrastructure manager deploys the analysis environment on any site according to situations.

Figure 5:
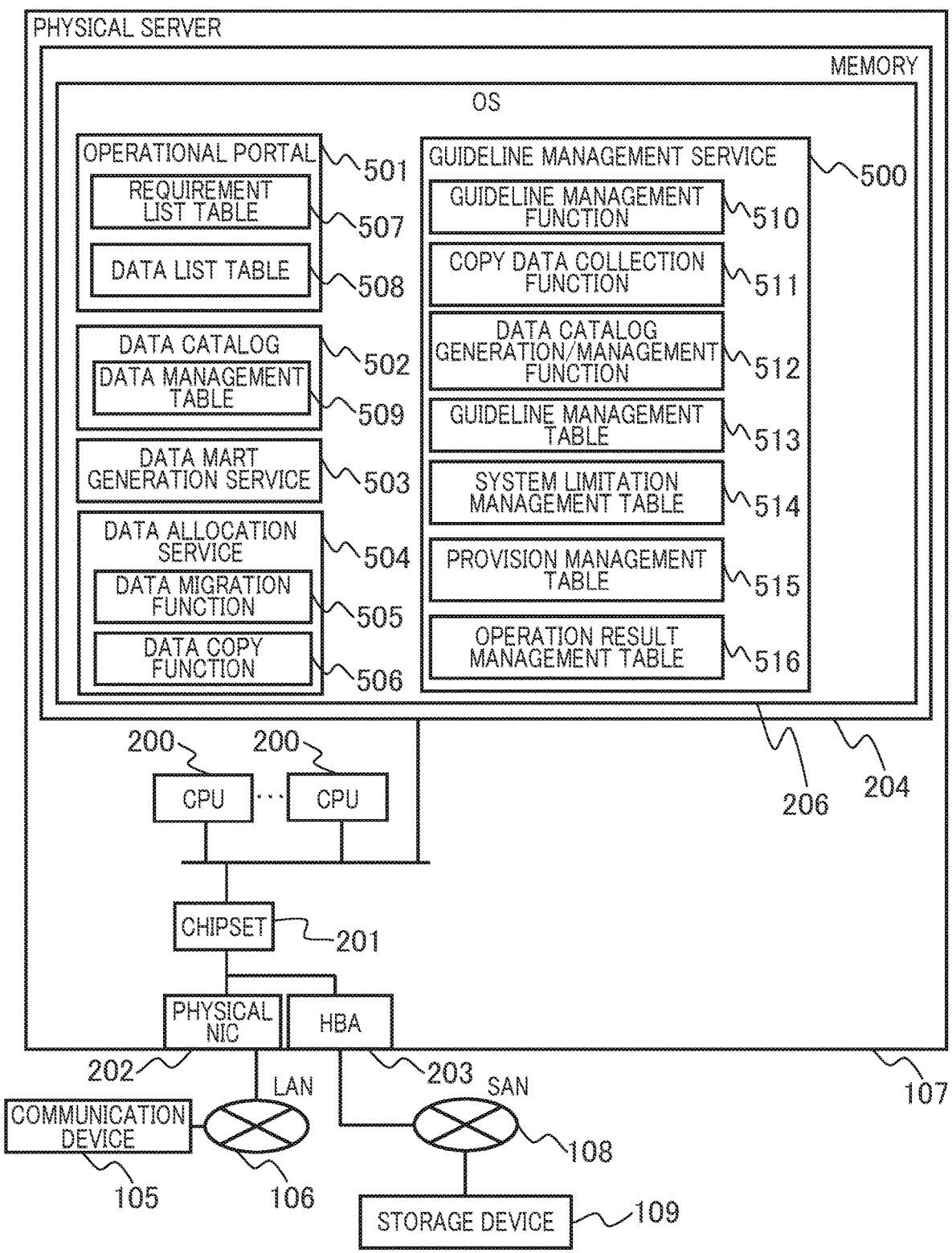
FIG. 5 illustrates a configuration of a management system 104.

FIG. 5 illustrates a configuration of the management system 104. The management system 104 uses the same hardware configuration as the public cloud system 103, the on-premise system 102, or the edge system 101.

In the management system 104, the CPU 200 executes programs stored in the memory 204 to allow the management system 104 to implement functions such as an operational portal 501, a data catalog 502, a data mart generation service 503, a data allocation service 504, and a guideline management service 500. These functions may be referred to as functional portions or units. These functions may be embodied as hardware such as a dedicated circuit, or as a combination of software and hardware. Other computers capable of communicating with the management system 104 may implement some of the functions of the management system 104.

The guideline management service 500 includes a guideline management function 510, a copy data collection function 511, a data catalog generation/management function 512, a guideline management table 513, a system limitation management table 514, a provision management table 515, and an operation result management table 516. The guideline management function 510 controls selection guidelines for multiple copy data. The copy data collection function 511 collects information on copy data generated and allocated at the sites configuring the hybrid cloud system 110. The data catalog generation/management function 512 prepares a data management table 509 from the copy data information collected by the copy data collection function 511 and generates the data catalog 502. The guideline management table 513 registers the effects of the method of allocating copy data. The system limitation management table 514 registers the operational status of infrastructure resources for the sites configuring the hybrid cloud system 110. The provision management table 515 registers job schedules of the sites configuring the hybrid cloud system 110. The operation result management table 516 registers a past history of creating or allocating copy data.

The operational portal 501 includes an input function and a display function used by a user such as an analyst and further includes a requirement list table 507 and a data list table 508. The requirement list table 507 registers the cost, processing performance, and provisioning time as the requirements requested by the analyst, and is displayed as a list of requirements for the operational portal 501. The data list table 508 is registered by acquiring the copy data information as a management target from the data management table 509 managed by the data catalog 502 and is displayed as a list of data for the operational portal 501. FIG. 13 illustrates a screen of the operational portal 501.

The data catalog 502 includes the data management table 509. The data management table 509 registers detailed information on each data allocated to the sites configuring the hybrid cloud system 110. Management of the data management table 509 enables the data catalog 502 to perceive the information on each data allocated to the sites configuring the hybrid cloud system 110.

The data mart generation service 503 automatically generates the data mart 301 by acquiring the scheme information on a database and configuring tables or columns to be used.

The data allocation service 504 includes a data migration function 505 and a data copy function 506. The data copy function 506 generates a copy for the data mart 301, the copy data 302, or the backup data 212, for example, generated by the data mart generation service 503. The data migration function 505 moves the copy data 302 generated by the data copy function and each data already allocated to the sites configuring the hybrid cloud system 110.

FIG. 6 illustrates the guideline management table 513.

The guideline management table 513 manages information about the situations including the effects (cost-effectiveness and processing effect) of allocating the copy data 302 to the sites configuring the hybrid cloud system 110.

Specifically, the guideline management table 513 stores information such as a requirement ID 600, a requirement name 601, a copy data ID 602, a copy data name 603, an allocation location 604, a provision destination 605, a provisioning time 606, cost-effectiveness 607, a cost rank 608, an application deployment destination 609, a processing effect 610, and a processing rank 611.

The requirement ID 600 stores the identification number of the requirement. The requirement name 601 stores the name of the requirement. In the drawing, the requirement name shows "cost" but also represents processing performance (processing speed) and provisioning time, for example, in addition to the cost. The copy data 602 stores the identification number of the copy data 302. The copy data name 603 stores the name of the copy data 302. The allocation location 604 stores names of allocation locations of the copy data 302, namely, the names of the edge system 101, the on-premise system 102, and the public cloud system 103. The provision destination 605 stores names of locations to allocate the copy data 302, namely, the names of the edge system 101, the on-premise system 102, and the public cloud system 103. The provisioning time 606 stores the provisioning time in minutes, for example, required to allocate the copy data 302 to the provision destination. The cost-effectiveness 607 stores costs (yen) of allocating the copy data 302 to the provision destination. The cost rank 608 stores ranks prioritized by the costs of allocating the copy data 302 to the provision destination. The application deployment destination 609 stores names of operation destinations of applications used by the analyst, namely, the names of the edge system 101, the on-premise system 102, and the public cloud system 103. The processing effect 610 stores processing speeds in minutes required for applications used by the analyst to use the copy data 302. The processing rank 611 stores ranks prioritized by processing speeds at which applications used by the analyst use the copy data 302.

FIG. 7 illustrates the provision management table 515.

The provision management table 515 manages information about the schedule at which data is generated (or prepared) at the sites configuring the hybrid cloud system 110.

Specifically, the provision management table 515 stores information such as a job ID 700, a job name 701, a target application 702, an application operation destination 703, a target data 704, a data type 705, a data allocation destination 706, a data flow 707, a migrated data allocation destination 708, a migrated data 709, a migrated data type 710, implementation date and time 711, a person in charge 712, and a job time 713.

The job ID 700 stores a job identification number. The job name 701 registers a job name. The target application 702 registers the name of an application to be deployed in the job. The application provision destination 703 stores names of the application operation destinations, namely, the names of the edge system 101, the on-premise system 102, and the public cloud system 103. The target data 704 registers the name of data targeted for the job. The data type 705 registers type names of job target data, namely, the types of the IoT data 210, the backup data 211, the data lake 300, the data mart 301, the copy data 302, and the snapshot 400. The data allocation destination 706 registers names of data allocation destinations, namely, the names of the edge system 101, the on-premise system 102, and the public cloud system 103. The data flow 707 registers the name of a data flow representing the data generation procedure. The migrated data allocation destination 708 registers names of allocation destinations of the data generated by the data flow, namely, the names of the edge system 101, the on-premise system 102, and the public cloud system 103. The migrated data 709 registers data generated by the data flow. The migrated data type 710 registers types of migrated data, namely, the types of the IoT data 210, the backup data 211, the data lake 300, the data mart 301, the copy data 302, and the snapshot 400. The implementation date and time 711 registers the implementation date and time (or implementation completion date and time) of a job. The person in charge 712 registers the name of a person who performs a job. The job time 713 registers the time required for a job. The implementation date and time and the job time above concern the data schedule.

The registered contents of the data types for the data type 705 and the migrated data type 710 are examples. Various data types may be available according to uses such as process data and production data, for example.

FIG. 8 illustrates the system limitation management table 514.

The system limitation management table 514 manages information on the infrastructure resources of the sites configuring the hybrid cloud system 110 such as the operating status or access rights. In this sense, the table may be also referred to as an infrastructure resource management table.

Specifically, the system limitation management table 514 stores information such as a site ID 800, a site name 801, access right 802, R/W 803, server information 804, a server name 805, CPU cores 806, a CPU utilization rate 807, a memory size 808, a memory utilization rate 809, a volume size 810, storage information 811, a device name 812, a volume name 813, capacity 814, a utilization rate 815, and a busy rate 816.

The site ID 800 registers identification numbers of the sites configuring the hybrid cloud system 110. The site name 801 registers the names of the edge system 101, the on-premise system 102, and the public cloud system 103 configuring the hybrid cloud system 110. The access right 802 registers group names indicating the access right for the sites configuring the hybrid cloud system 110. The group name may correspond to role information or may be discretionarily specified by a security administrator in the access right setting. The R/W 803 registers an identifier "R" for reference only, "W" for update only, and "R/W" for reference and update. The server information 804 registers server information about the sites configuring the hybrid cloud system 110. The server name 805 registers the name of a server. The CPU cores 806 registers the number of CPU cores for the server. The CPU utilization rate 807 registers a CPU utilization rate of the server. The memory size 808 registers a memory size of the server. The memory utilization rate 809 registers a memory utilization rate of the server. The volume size 810 registers the capacity of a volume mounted on the server. The storage information 811 registers storage information about the sites configuring the hybrid cloud system 110. The device name 812 registers the device name of a storage. The volume name 813 registers the volume name provided by the storage. The volume provided by the storage may represent a volume logically resulting from a Raid configuration or may represent a virtual volume resulting from a virtual logical group based on a combination of Raid groups. The capacity 814 registers the capacity of a volume provided by the storage. The utilization rate 815 registers a utilization rate of the capacity of the volume provided by the storage. The busy rate 816 registers a busy rate based on the number of accesses to the volume provided by the storage.

FIG. 9 illustrates the data management table 509.

The data management table 509 manages the management information about data used (allocated) at the sites configuring the hybrid cloud system 110.

Specifically, the data management table 509 stores information such as a data ID 900, a data name 901, a type 902, a data allocation location 903, a pathname 904, a hush ID 905, generated date and time 906, a size 907, and access right 908.

The data ID 900 registers a data identification number. The data name 901 registers the name of data. The type 902 registers data types, namely, the types of the IoT data 210, the backup data 211, the data lake 300, the data mart 301, the copy data 302, and the snapshot 400. The registered contents of the data types are examples. Various data types may be available according to uses such as process data and production data, for example. The data allocation location 903 registers the edge system 101, the on-premise system 102, and the public cloud system 103 as data allocation destinations and the sites configuring the hybrid cloud system 110. The pathname 904 registers the pathname indicating a data storage destination. The hush ID 905 registers a hash value generated by the hash function for the data. The created date and time 906 registers the date and time of data creation. The size 907 registers the size of data. The access right 908 registers a group name indicating the access right for the data. The group name may correspond to role information or may be discretionarily specified by a security administrator in the access right setting.

FIG. 10 illustrates the operation result management table 516.

The operation result management table 516 manages information about the effects of data provided at the sites configuring the hybrid cloud system 110.

Specifically, the operation result management table 516 stores information such as an acquisition date and time 1000, a copy data ID 1001, a copy data name 1002, an allocation location 1003, a provision destination 1004, provisioning time 1005, cost-effectiveness 1006, an application deployment destination 1007, a processing effect 1008, and a data usage frequency 1009.

The acquisition date and time 1000 registers the date and time to have acquired the information about each item of the operation result management table 516 after data was provided. The copy data ID 1001 registers the identification number of the copy data 302 provided to the analyst. The copy data name 1002 registers the name of the copy data 302 provided to the analyst. The allocation location 1003 registers the names of the edge the system 101, the on-premise system 102, and the public cloud system 103 that are the sites configuring the hybrid cloud system 110 and locations to allocate source data for the copy data 302 provided to the analyst. The provision destination 1004 registers the names of the edge system 101, the on-premise system 102, and the public cloud system 103 that are the sites configuring the hybrid cloud system 110 and provision destinations of the copy data 302 provided to the analyst. The provisioning time 1005 registers the provisioning time of the copy data 302 provided to the analyst. The cost-effectiveness 1006 registers an increase or decrease in costs after the copy data 302 is provided to the analyst. The application deployment destination 1007 registers the names of the edge system 101, the on-premise system 102, and the public cloud system 103 that are the sites configuring the hybrid cloud system 110 and destinations of deploying applications to use the copy data 302 provided to the analyst. The processing effect 1008 registers an increase or decrease in the processing performance after the copy data 302 is provided to the analyst. The data usage frequency 1009 registers the usage frequency of source data for the copy data 302 provided to the analyst.

Figure 11:
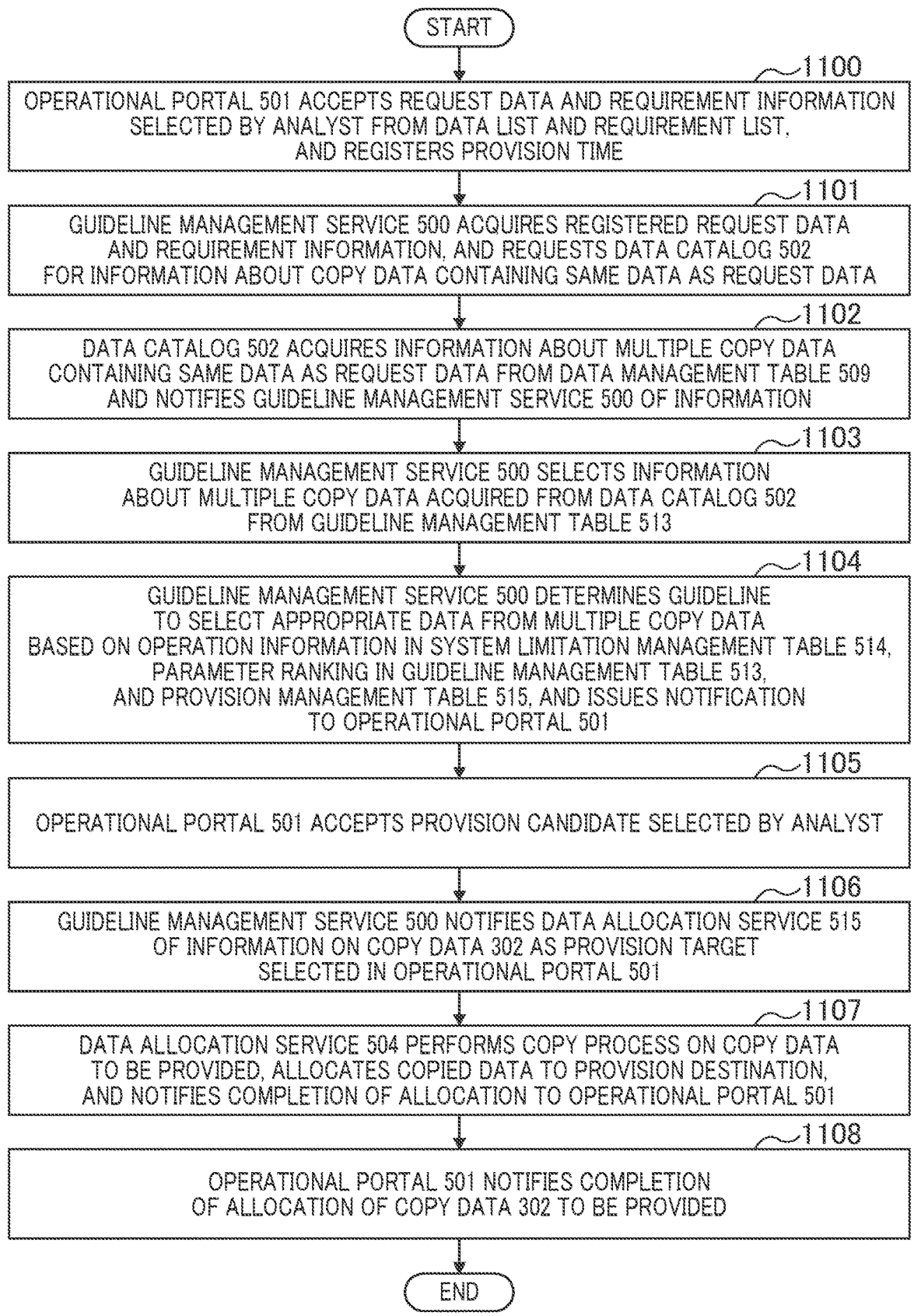
FIG. 11 is a flowchart illustrating a process to provide guidelines for selecting copy data.

With reference to FIG. 11, the description below explains a process that allows the analyst to request analytic data and provides a guideline for selecting copy data according to the analyst's request from multiple copy data containing the same data as the analytic data. FIG. 11 is a flowchart illustrating the process to provide guidelines for selecting copy data. The analyst issues a request to use the hybrid cloud system 110 for the analysis such as improvement of final operations or sales improvement.

The operational portal 501 displays a screen containing a data list and a requirement list according to an operation of the analyst. Based on the input operation of the analyst, the process accepts the data to be used (request data) and the usage requirement (requirement information) selected from the displayed data list and requirement list and registers the time to provide the request data (step 1100). The displayed data list includes the information about data such as transaction data or operation data that is acquired from the data management table 509 of the data catalog 502 and is stored in the hybrid cloud system 110. The requirement list includes the cost, processing performance, and provision time registered to the requirement list table 507. Inputs may be selected from the values or items displayed in the requirement list or may be supplied as any values.

The guideline management service 500 acquires the request data, requirement information, and provision time having been accepted by the operational portal 501 and entered by the analyst and requests the data catalog 502 for information about the copy data containing the same data as the request data (step 1101).

The data catalog 502 generates and updates the data management table 509 from the copy data information collected by the copy data collection function 511 each time the above request is received. From this data management table 509, the process acquires all the information about the copy data containing the same data as the request data requested by the guideline management service 500 and notifies the guideline management service 500 of the information about the multiple copy data 302 as a target (step 1102).

The guideline management service 500 selects the information that is contained in the guideline management table 513 and is related to the information about the multiple copy data 302 acquired from the data catalog 502 (step 1103). The guideline management table 513 previously registers past result values for the provisioning time, cost-effectiveness, and processing effect registered to the operation result management table 516 in terms of all copy data and respective item values calculated based on the specifications such as the network traffic of the infrastructure environment.

The guideline management service 500 determines a guideline to select appropriate data from the multiple copy data based on the operation information in the system limitation management table 514, ranking the of cost-effectiveness and processing effect (also referred to as parameters) in the guideline management table 513, and the provision management table 515 and issues notification to the operational portal 501 (step 1104). This process will be described in detail later with reference to FIG. 13.

The operational portal 501 displays a provision candidate for the copy data 302 and accepts a provision candidate for the copy data 302 selected by the analyst, namely, the request for the provision data (step 1105). The provision candidate for the copy data 302 includes the information on the cost, processing speed, and provision time as a result of selecting the copy data candidate that satisfies the analyst's request. If the analyst's requirement is not satisfied, the process presents a provision candidate for the copy data 302 to cause a result approximate to the analyst's requirement.

The guideline management service 500 acquires the information on the copy data 302 to be provided and selected by the operational portal 501 from the guideline management table 513 and notifies the data allocation service 515 of the information on the copy data 302 to be provided (step 1106).

The data allocation service 504 uses the data copy function 506 to copy the copy data 302 to be provided and uses the data migration function 505 to allocate the copied copy data 302 to the provision destination. The process notifies the operational portal 501 that the allocation is complete (step 1107).

The operational portal 501 notifies the analyst that the copy data 302 to be provided has been deployed (step 1108). According to the example of the operational portal 501 in FIG. 13, the copy data has been allocated to the public cloud as a provision destination. Upon receiving this notification from the operational portal 501, the analyst can perform the analysis by using the copy data 302 in the public cloud system 103.

Figure 12:
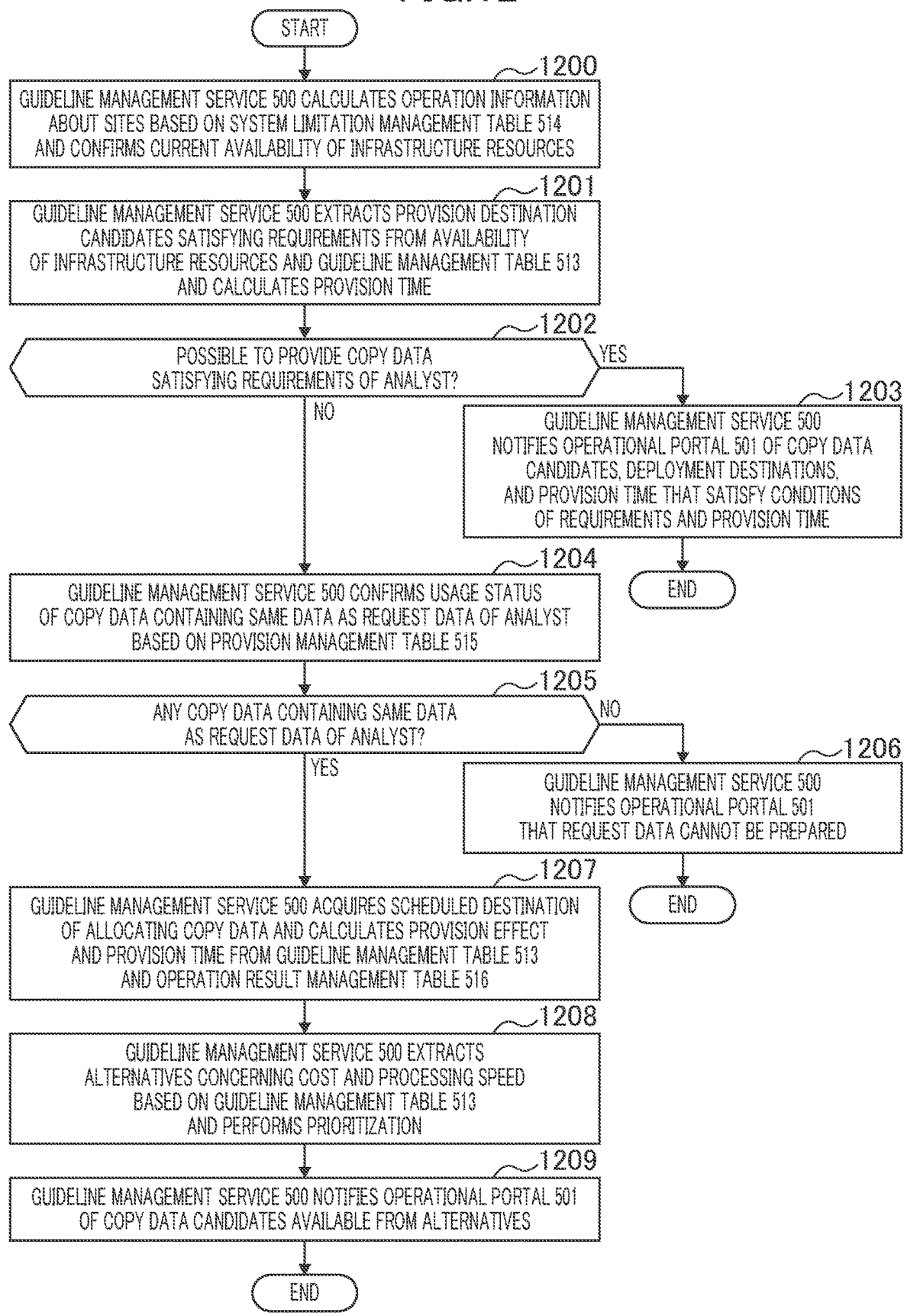
FIG. 12 is a flowchart illustrating a process to select copy data appropriate to an analyst.

FIG. 12 illustrates a flowchart relating to a specific process at step 1104 (the process to select the copy data suitable for the analyst) in FIG. 11.

The guideline management service 500 acquires operation information about the infrastructure resources for the physical server 107 and the storage device 109 from the system limitation management table 514, calculates the operation information about the infrastructure resources at the sites configuring the hybrid cloud system 110, and confirms the current availability of the infrastructure resources (step 1200).

The guideline management service 500 extracts the edge system 101, the on-premise system 102, and the public cloud system 103 as provision destination candidates compliant with the requirements of the analyst from the availability of infrastructure resources at the sites configuring the hybrid cloud system 110 and the registration information in the guideline management table 513, and then calculates the provision time (step 1201). The provisioning time 606, the cost-effectiveness 607, and the processing effect 610 as the registered information in the guideline management table 513 are used to confirm the compliance with the requirements and calculate the provision time.

The guideline management service 500 determines whether it is possible to provide the copy data 302 that satisfies the analyst's requirements (step 1202). As a result of the determination, it may be possible to provide the copy data 302 that satisfies the analyst's requirements. Then, the guideline management service 500 notifies the operational portal 501 of multiple candidates for the copy data 302, deployment destinations, cost-effectiveness, processing effect, and provision time that satisfy the conditions of the requirement information and the provision time (step 1203).

It may be impossible to provide the copy data 302 that satisfies the analyst's requirements. Then, the guideline management service 500 confirms the usage status of the copy data 302 containing the same data as the analyst's request data, based on the provision management table 515 (step 1204). The provision management table 515 registers schedules such as deployment jobs at the sites configuring the hybrid cloud system 110 and makes it possible to confirm which copy data 302 is allocated to which site at which timing.

As described above, the provision management table 515 may not provide the copy data 302 containing the same data as the analyst's request data (step 1205). Then, the guideline management service 500 notifies the operational portal 501 that request data cannot be prepared (step 1206). For example, the analyst's request data here corresponds to "transaction data in 2020" in the "data list" in FIG. 13. "CopyData2" and "CopyData3" in the "list of provision data candidates" in FIG. 13 represent copy data of the transaction data in 2020 and provide candidates for the analyst's provision data. For example, the analyst can select "CopyData2" as the candidate and use this data for the analysis.

The provision management table 515 may provide the copy data 302 containing the same data as the analyst's request data. Then, the guideline management service 500 acquires the scheduled destination of allocating the copy data 302 and calculates the provision effect and the provision time from the guideline management table 513 and the operation result management table 516 (step 1207).

The guideline management service 500 extracts alternatives concerning the cost and the processing speed from the provision effect and the provisioning time extracted based on the guideline management table 513 and prioritizes the multiple copy data 302 (step 1208).

The guideline management service 500 notifies the operational portal 501 of multiple candidates for the copy data 302, the provision effect, and the provision time available from the alternative (step 1209). The alternative here signifies extraction of the copy data 302 that does not satisfy the analyst's requirements and the provision time compared to the analyst's request data, but satisfies the other requirements, and is scheduled to be deployed or causes approximate states (cost or processing speed). In terms of the latter, for example, the guideline management service 500 acquires the provision management table 515 and confirms the schedule to generate copy data containing the same data as the analyst's request data. In terms of the copy data to be generated, the process confirms the cost-effectiveness and the processing effect in the guideline management table 513 and the cost-effectiveness and the processing effect in the operation result management table 516. The process estimates the cost and the processing speed to provide the copy data to be generated and presents a copy data candidate, namely, a value approximate to the analyst's requirement. As a mode of the presentation, the screen of the operational portal 501 (FIG. 13) displays a list of provision data candidates.

If the analyst cannot understand the configuration or mechanism of the hybrid cloud system 110 and cannot make a specific request, the above-mentioned processes can provide copy data candidates appropriate for the analyst's request. If the analyst's requirements cannot be satisfied, it is possible to provide copy data candidates appropriate for the analyst according to states of the schedule or requirements.

FIG. 13 illustrates a screen that is displayed on the operational portal 501 and is used as the analyst operation screen.

A screen 1300 of the operational portal 501 includes display buttons such as "data information acquisition," "request transfer," and "provision start." When the analyst operates the data information acquisition button at step 1100, the screen displays information containing the data list and the requirement list.

The data list is configured to select a display item (black mark in the drawing) to invoke a request data list and detailed information about request data. The requirement list is configured to select any of cost, processing performance, provision time, and none as intended requirements, and enter specific values in a target criterion column. After the data list and the requirement list are selected, manipulation of the request transfer button transmits the analyst's request data, requirement information, and provision time from the operational portal 501 to the guideline management service 300.

The list of provision data candidates automatically outputs the processing result of the selection guideline provision for copy data (FIG. 11), namely, a list of multiple candidates for the copy data 302 appropriate for the analyst's request. The output result displays the effect or the provision time of the candidates for the provided copy data 302. The analyst selects the copy data 302 to be used from the output result and manipulates the provision start button. This enables a process using the copy data appropriate for the analyst's request.

There may be a case of not completely satisfying the analyst's requirement (intended requirement such as cost, processing performance, or provision time). In such a case, the present embodiment outputs copy data approximate to (suitable for) the requirement (target criterion) as a candidate. In this case, the analyst's intended requirement cannot be satisfied. However, it is expected that the analyst can use copy data likely to be available for the analysis from the resultant candidates. The analyst selects the intended requirement. However, to which extent the requirement should be satisfied depends on the analyst's situation, namely, to which extent the analyst needs to conform to the guideline or whether the analyst needs to perform a job even after waiting several hours, for example.

FIG. 14 illustrates a screen of detailed information selected from the screen of FIG. 13.

The detailed data screen 1400 displays schema information such as attribute name, data type, description, and value. The attribute name displays product ID, product name, unit price, shipment quantity, and registration date. The data type displays data formats such as Integer, String, and Date for each item of the attribute name. The value displays a sample value registered to each attribute.

The analyst can select the column to be used from a selection row, enter a selection period, and manipulate the register or delete button.

Second Embodiment

The first embodiment presents candidates for copy data 302 to be provided according to the analyst's requirement information. In this case, however, any copy data 302 may be used as long as it is appropriate for the analyst's requirement information. Moreover, the alternative may provide multiple copy data 302 satisfying similar conditions. To solve this, the second embodiment allows the guideline management table 513 to include requests of a third party (such as an infrastructure manager). Thereby, it is possible to provide the copy data 302 appropriate for the request of the third party while providing the copy data 302 appropriate for the analyst.

The second embodiment will be described with reference to FIGS. 15 and 16.

FIG. 15 illustrates a guideline management table 15513 according to the second embodiment. The guideline management table 15513 adds the information of prioritization 1501 to the guideline management table 513 (FIG. 6) of the first embodiment. The other items 600 through 611 are similar to those in the first embodiment.

The prioritization 1501 registers alphabetical letters A, B, and C denoting priorities. The prioritization 1501 allows the infrastructure manager to recommend the analyst to select preferential candidates for each site of the hybrid cloud system 110, the Infrastructure environment of each site, and the copy data 302 for each site. As an example, the new physical server 107 is introduced to the on-premise environment and the use of this new server is preferentially recommended. As another example, other highly prioritized users are recommended to preferentially use a certain period such as replacement of the infrastructure environment. In these cases, the infrastructure manager can settle the priorities to use the physical server 107 or the environment.

The same procedure as the example described in FIG. 13 can apply to the method of selecting candidates for the copy data 302 to be provided to the analyst.

As above, the addition of the infrastructure manager's requirements makes it possible to take into account the infrastructure manager's requirements in addition to the analyst's requirements. It is possible to further take into account the requirements of various parties by including the role of a third party other than the infrastructure manager. When another analyst is performing a similar analysis job, for example, the infrastructure manager can change the setting of the prioritization 1501 to provide an environment comparable to the usage environment of another analyst. For example, suppose analyst A already performs an analysis job by using "transaction data in 2020" and analyst B also needs to perform an analysis job by using "transaction data in 2020." Then, it is possible to provide analyst B with an environment approximate to the analysis environment of analyst A and therefore achieve an effect of eliminating the need to take into account the provision environment from scratch.

As yet another example, FIG. 16 illustrates a guideline management table 16513 including a provision count and the usage of data. The guideline management table 16513 adds information such as a provision count 1600 and a provision count rank 1601 to the guideline management table 513 illustrated in FIG. 6. The other items 600 through 611 are similar to those in the first embodiment.

The provision count 1600 registers the number of times the copy data 302 is provided to the analyst. The provision count rank 1601 registers the ranking according to the provision count. For example, provision count rank "4" is assigned to provision count 0 to 4. Provision count rank "3" is assigned to provision count 5 to 9. Provision count rank "2" is assigned to provision count 10 to 14. Provision count rank "1" is assigned to provision count 15 or higher.

An increase in the provision count of the copy data 302 is considered an increase in the use opportunity. When the copy data corresponding to a large provision count is provided preferentially, it is possible to prevent the analyst from re-issuing a request and provide the copy data 302 more appropriate for the analyst. One of the provision count 1600 and the provision count rank 1601 may be available.

FIG. 16 shows the example of providing the copy data based on the provision count. Another example can provide the copy data 302 appropriate for the analyst according to the usage of the copy data 302. In this case, a column for the usage of copy data replaces the provision count 1600 or the provision count rank 1601 in FIG. 16. The copy data usage includes reference to the copy data or no real-time property, for example. For example, only the reference to copy data requires no update. It is therefore possible to provide the copy data 302 shared with other users. When the real-time property is unnecessary, past data can be used and the backup data 212 can be used. The provisioning time can shorten.

Third Embodiment

The first embodiment allows the analyst to select a candidate for copy data 302 and thereby provides the copy data 302. However, the third embodiment eliminates the analyst's selection and automatically provides the copy data 302 appropriate for the analyst at the request of the analyst.

FIG. 17 is a flowchart illustrating the process of providing a selection guideline for copy data. This flowchart eliminates the need for selection by the analyst from the process illustrated in FIG. 11 and shows the process until automatically notifying the copy data. Steps 1100 through 1103 in FIG. 17 are equal to steps 1100 through 1103 in FIG. 11 and a description is omitted for simplicity.

The guideline management service 500 determines the guideline for selecting appropriate data from multiple copy data based on the operation information in the system limitation management table 514, parameter ranking in the guideline management table 513, and the provision management table 515 (step 1704). The copy data most approximate to the analyst's request is selected and provided. Specifically, the process confirms the operation information such as unused resources in the system limitation management table 514 and automatically determines a copy data candidate assumed to be higher in the cost rank and the processing rank (low cost-effectiveness and fast processing effect) in the guideline management table 513.

The guideline management service 500 acquires the information about the copy data 302 as a provision target selected based on the determined guideline from the guideline management table 513 and notifies the data allocation service 515 of the information about the copy data 302 to be provided (step 1705).

The data allocation service 504 uses the data copy function 506 to copy the copy data 302 to be provided and uses the data migration function 505 to allocate the copied copy data 302 to the provision destination. Allocation completion is notified to the operational portal 501 (step 1706).

The operational portal 501 notifies completion of allocating the copy data 302 to be provided (step 1707). According to this notification, the analyst can use the copy data 302 for the analysis.

As above, the third embodiment provides candidates for the copy data 302 to be provided according to the analyst's requirement information. It is possible to provide alternative candidates for the copy data 302 if the requirement information is not satisfied. More appropriate copy data 302 can be provided by allowing the guideline management table 513 to include past advice from the infrastructure manager or the analyst. Moreover, it is possible to automatically provide the appropriate copy data 302 if notification to the analyst is unnecessary.

The data allocation service 504 allocates the same copy data (second copy data) 302 to the same site to facilitate the selection of the copy data 302 appropriate for the analyst each time the copy data (first copy data) 302 is provided. If the same copy data (second copy data) 302 is optimal despite different requirements, it is possible to provide the second copy data in time for the provision time. However, the storage capacity of the site may become insufficient if the same copy data 302 is copied each time copy data is provided. To solve this, a survival period (such as a time limit of one month) is settled according to the frequency of providing the copy data 302. The data allocation service 504 reduces unnecessary copy data (first and second copy data) 302 that exceeds the survival period. This process can prevent a capacity shortage of the storage at the data allocation destination site and provide the copy data 302 appropriate for the analyst to fit with the provision time.

While there have been described the specific embodiments, the present invention is not limited to the above-described embodiments but may be variously modified or improved without departing from the spirit and scope of the invention.

What is claimed is:

1. An information processing device that performs processes to provide copy data, comprising:
    an operational portal that registers user request information;
    a data catalog that manages information about a plurality of copy data located at a plurality of sites configuring a hybrid cloud system;
    a data allocation service that allocates duplicated copy data to the plurality of sites; and
    a guideline management service that selects a copy data candidate appropriate for user request information,
    wherein the guideline management service acquires information about copy data containing the same data as user request information from the data catalog and verifies whether there is a copy data candidate satisfying user request information,
    wherein, when there is a copy data candidate satisfying the user request information, the copy data is allocated to the plurality of sites, and
    wherein, when there is no copy data candidate satisfying the user request information, the copy data is allocated to the site on condition that the copy data is optimal enough to satisfy a generation schedule and a processing speed of a copy data candidate satisfying the user request information.

2. The information processing device according to claim 1,
    wherein, when there is a copy data candidate satisfying the user request information as a result of the verification concerning the presence or absence of a copy data candidate, the guideline management service notifies the operational portal of the copy data candidate, and
    wherein the operational portal accepts user selection from the copy data candidate.

3. The information processing device according to claim 1
    wherein, when there is no copy data candidate satisfying the user request information, the guideline management service allocates the copy data to the site on condition that the copy data is optimal enough to satisfy the generation schedule, the processing speed, and resource operation information about the user request information.

4. The information processing device according to claim 2,
    wherein the operational portal displays a screen including a list of requestable data, a requirement list including selection of cost, processing performance, and provision time as desired conditions, and a list of the copy data candidates.

5. The information processing device according to claim 1,
    wherein the guideline management service includes a guideline management table that registers cost-effectiveness, processing effect, and information on priorities based on cost-effectiveness and processing effect when the copy data is allocated, and
    wherein the copy data appropriate for the user is provided according to a priority in the guideline management table.

6. The information processing device according to claim 5,
    wherein an infrastructure manager can change a priority in the guideline management table and copy data appropriate for the user and the infrastructure manager is provided according to the priority.

7. The information processing device according to claim 1,
wherein the guideline management service includes a guideline management table that registers cost-effectiveness, processing effect, and one of a provision count and a provision count rank of copy data when the copy data is allocated, and
wherein the guideline management service provides copy data appropriate for the user request information based on one of the provision count and the provision count rank in the guideline management table.

8. The information processing device according to claim 1,
wherein the guideline management service includes a guideline management table that registers a plurality of usages of the copy data by the user, and
wherein the guideline management service provides copy data appropriate for the user request information based on the usage registered in the guideline management table.

9. The information processing device according to claim 1,
wherein, when first copy data appropriate for the user is provided, the data allocation service allocates second copy data, namely, a copy of the first copy data, to the same site as the first copy data,
wherein, when the same request as the user request information is issued, the guideline management service provides the second copy data, and
wherein a survival period for the second copy data is settled and the data allocation service deletes the second copy data corresponding to the survival period.

10. An information processing method of performing processes to provide copy data by using an information processing device, comprising the steps of:
allowing an operational portal to register user request information;
allowing a data catalog to manage the information about a plurality of copy data allocated to a plurality of sites configuring a hybrid cloud system;
allowing a data allocation service to allocate duplicated copy data to the plurality of sites; and
allowing a guideline management service to select copy data candidates appropriate for user request information,
wherein the guideline management service also acquires information about copy data, containing the same data as user request information, from the data catalog and verifies whether there is a copy data candidate satisfying user request information,
wherein, when there is a copy data candidate satisfying the user request information, the copy data is allocated to the plurality of sites, and
wherein, when there is no copy data candidate satisfying the user request information, the copy data is allocated to the plurality of sites on condition that the copy data is optimal enough to satisfy a generation schedule and a processing speed of a copy data candidate satisfying the user request information.

11. The information processing method according to claim 10,
wherein, when there is a copy data candidate satisfying the user request information as a result of the verification concerning the presence or absence of a copy data candidate, the guideline management service notifies the operational portal of the copy data candidate, and
wherein the operational portal accepts user selection from the copy data candidate.

12. The information processing method according to claim 10,
wherein, when there is no copy data candidate satisfying the user request information, the guideline management service allocates the copy data to the plurality of sites on condition that the copy data is optimal enough to satisfy the generation schedule, the processing speed, and resource operation information about the user request information.

13. The information processing method according to claim 10,
wherein the operational portal displays a screen including a list of requestable data, a requirement list containing selection of a plurality of desired conditions, and a list of the copy data candidates.

14. The information processing method according to claim 13,
wherein a screen of the operational portal includes display items such as a data information acquisition button, a request transfer button, and a provision start button,
wherein, when the data information acquisition button is operated, the operational portal displays the data list and the requirement list on the screen,
wherein user request data and requirement information are transmitted from the operational portal to the guideline management service when a request data list and a display item to invoke detailed information about request data are selected in the data list, at least one of cost, processing performance, and provision time is selected as the intended requirement in the requirement list, and the request transfer button is operated,
wherein a list of the provision data candidates automatically displays a list of a plurality of copy data candidates appropriate for a user request as a result of a process of the guideline management service to provide a selection guideline for copy data, and
wherein a user operation selects one piece of copy data from a plurality of copy data displayed in a list of the provision data candidates and the provision start button is operated to enable provision of copy data appropriate for a user request.

* * * * *